Jan. 6, 1942.  J. R. BRYANT  2,268,923
COMBINED GROUND WORKING AND SOIL PULVERIZING MACHINE
Filed Aug. 3, 1940  4 Sheets-Sheet 1
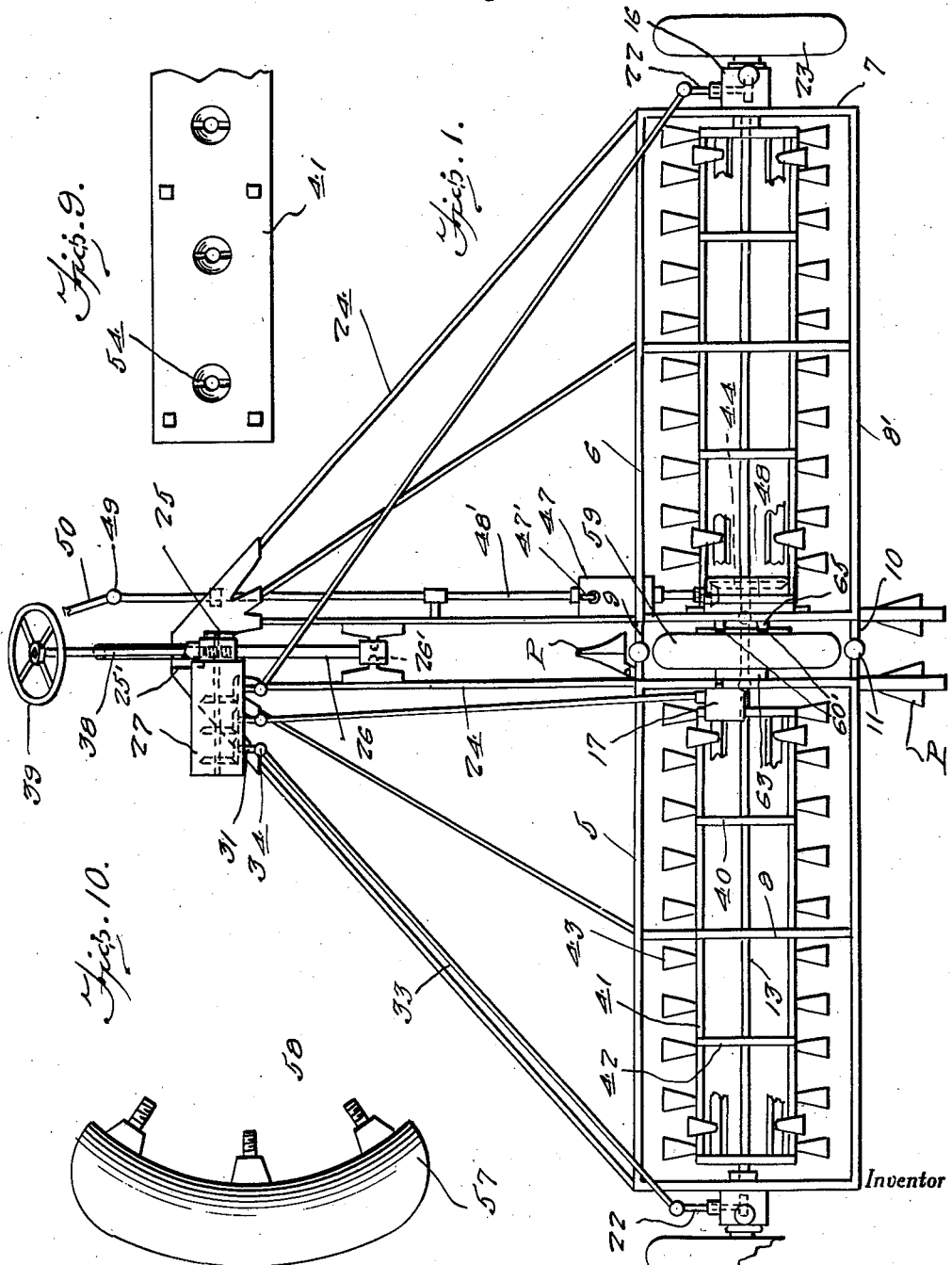
Inventor
James Russell Bryant
By Clarence A. O'Brien
Attorney Jan. 6, 1942.   J. R. BRYANT   2,268,923
COMBINED GROUND WORKING AND SOIL PULVERIZING MACHINE
Filed Aug. 3, 1940   4 Sheets-Sheet 2
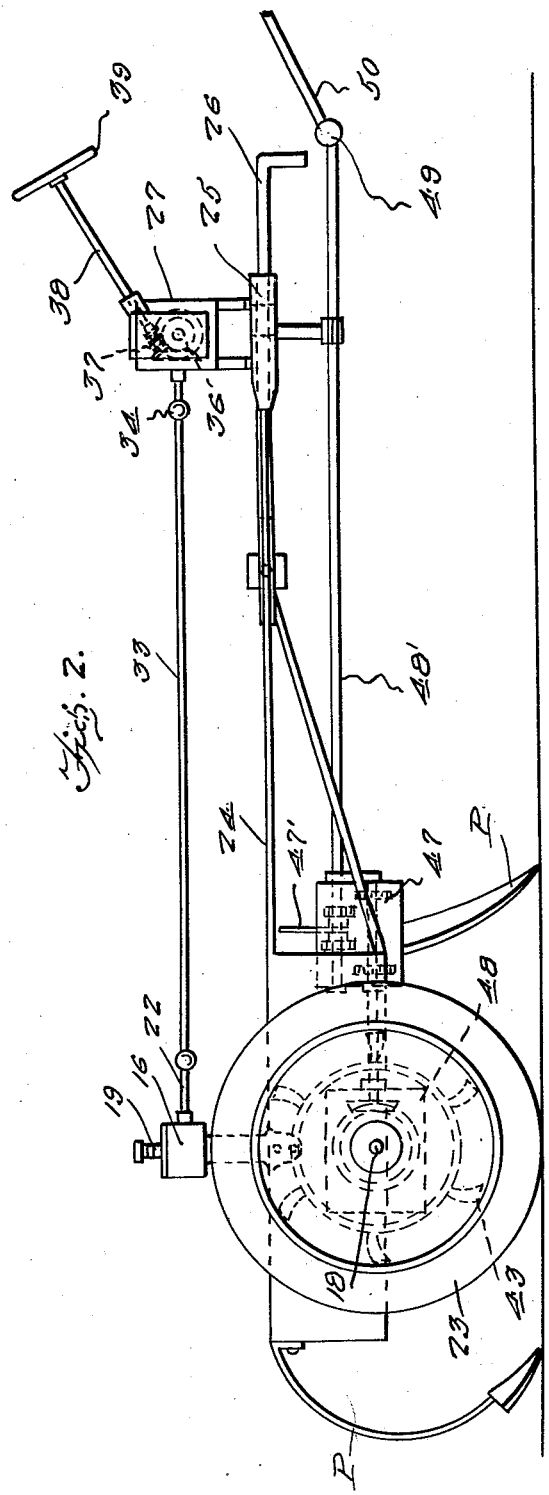
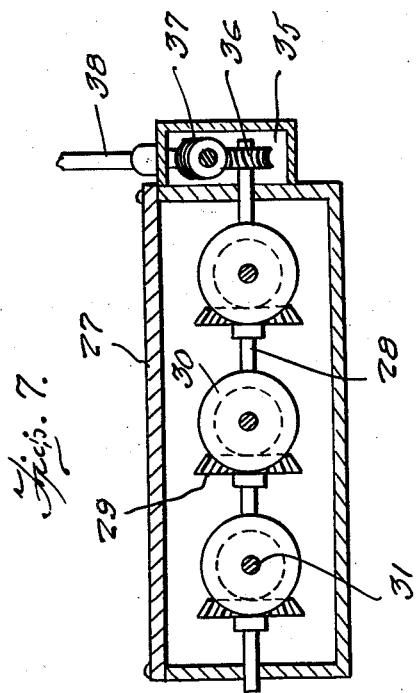
Inventor
James Russell Bryant
By Clarence A. O'Brien
Attorney

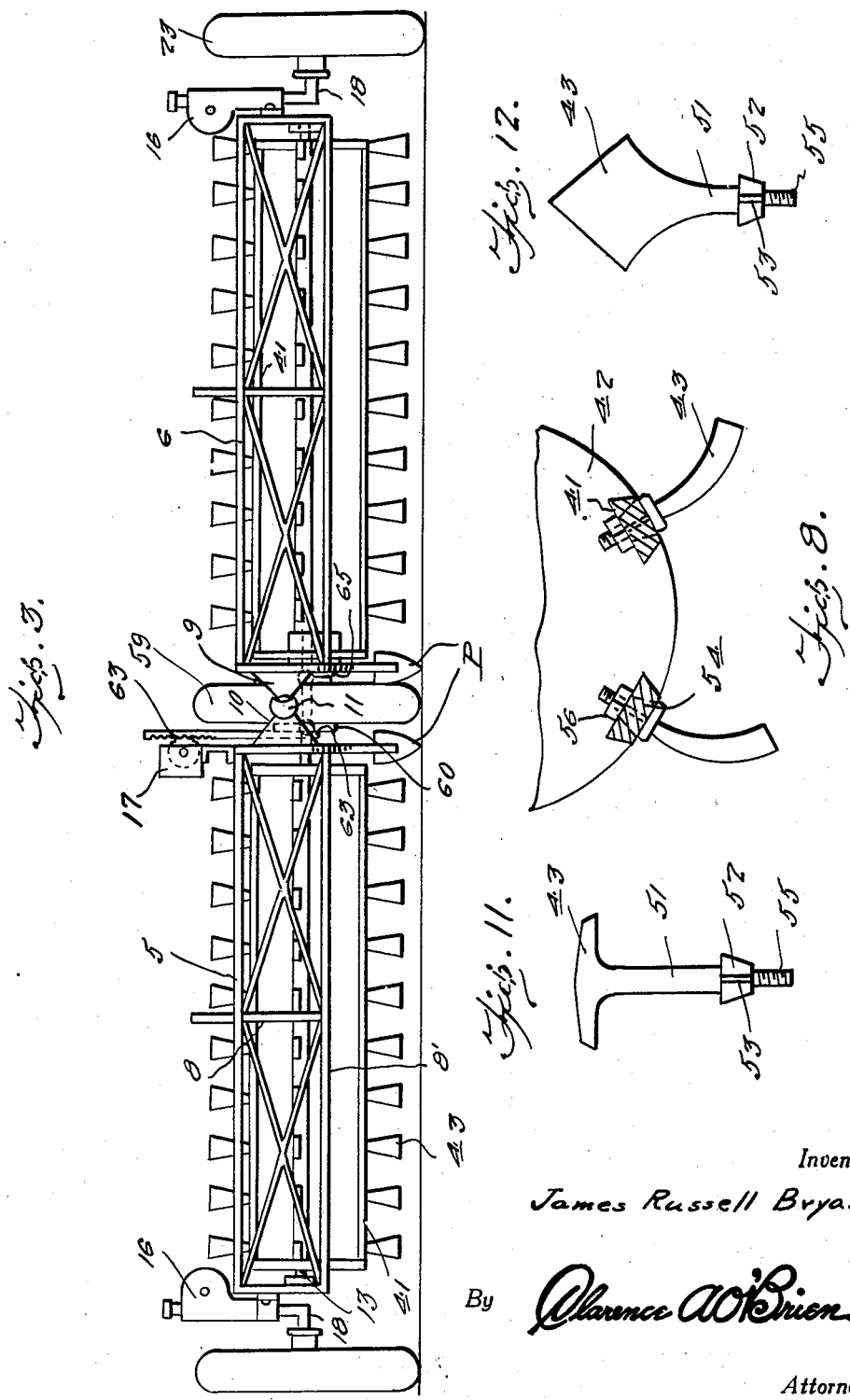

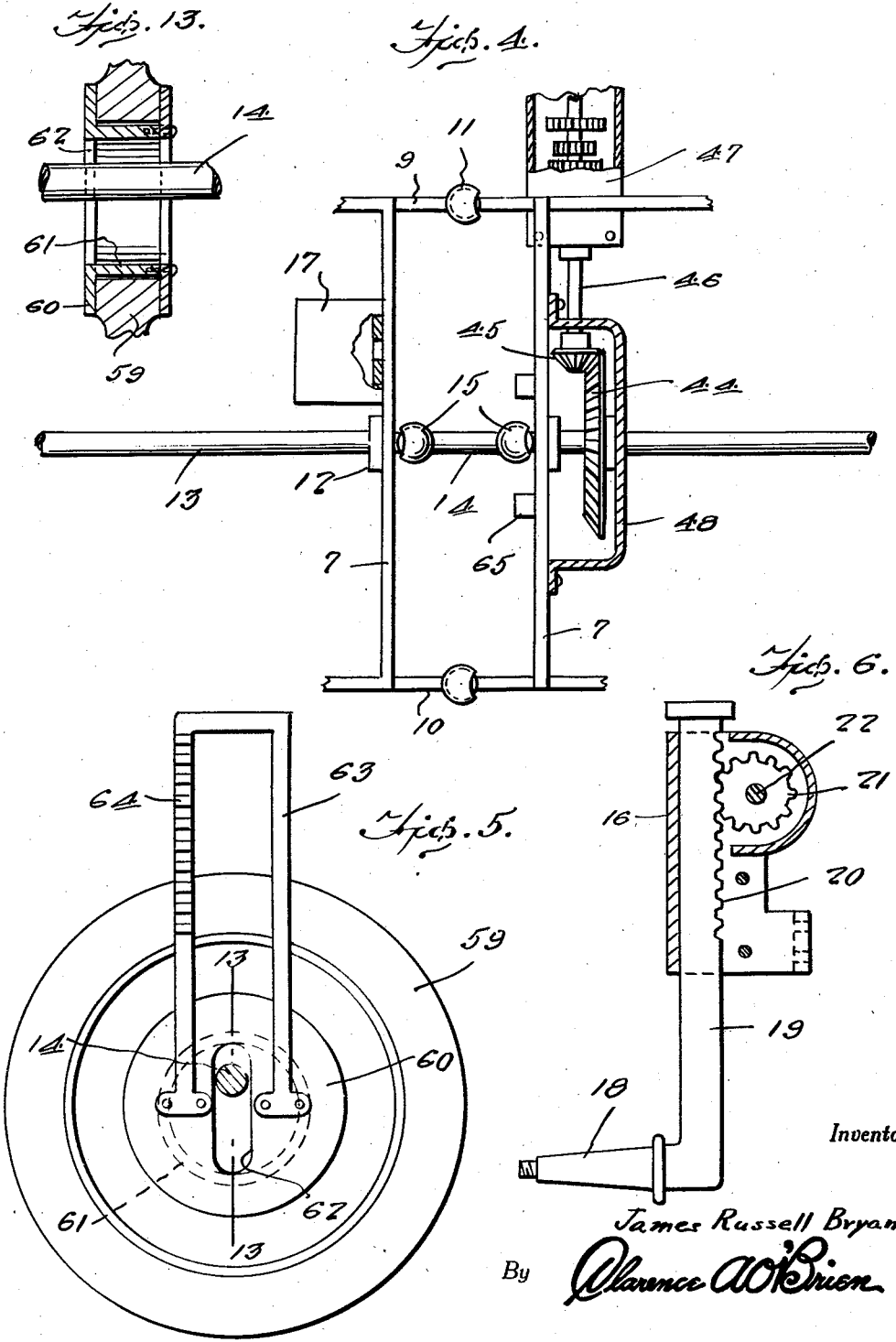

Patented Jan. 6, 1942

2,268,923

UNITED STATES PATENT OFFICE 2,268,923

COMBINED GROUND WORKING AND SOIL PULVERIZING MACHINE

James Russell Bryant, Strathroy, Ontario, Canada

Application August 3, 1940, Serial No. 350,751

1 Claim. (Cl. 97—40)

The present invention relates to new and useful improvements in farm implements and has for its primary object to provide a machine adapted for working the soil and also for breaking up the hard lumps of earth over which the machine is traveling.

An important object of the present invention is to provide a machine of this character equipped with a pair of rotating soil pulverizers and providing drive means for the pulverizers extending to a power take-off from the tractor employed for pulling the machine over the ground.

A further important object of the present invention is to provide a frame for the machine constructed of a pair of transverse sections having a ball and socket connection and providing ground wheels for the frame on which the frame is mounted for vertical adjustment to regulate the height of the pulverizing element.

An additional object is to provide rotating pulverizing members of novel construction.

A still further object is to provide a machine of this character of simple and practical construction, which is efficient and reliable in performance, relatively inexpensive to manufacture and maintain in operation and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which—

Figure 1 is a top plan view,

Figure 2 is a side elevational view,

Figure 3 is a rear elevational view,

Figure 4 is a detail of the ball and socket connection for the sections of the frame, Figure 5 is an elevational view of one of the adjusting brackets for the wheel, Figure 6 is a vertical sectional view of the housing for the upper end of the stub axle, Figure 7 is a vertical sectional view through the gear housing for the wheel adjusting mechanism, Figure 8 is a fragmentary detail of one form of the teeth for the pulverizing drum and with parts shown in section, Figure 9 is a fragmentary detail of one of the slats of the pulverizing drum, Figure 10 is a detail of a modified form of pulverizing blade, Figure 11 is a similar view of a further tooth construction, Figure 12 is a similar view of an additional tooth construction, and Figure 13 is a fragmentary sectional view taken on the line 13—13 of Figure 5.

Referring now to the drawings in detail, wherein for the purpose of illustration I have disclosed a preferred embodiment of the invention, the numerals 5 and 6 designate a pair of frame sections each including a pair of end plates 7 and transversely and longitudinally extending brace members 8 and 8'. The adjacent ends of the frame members 5 and 6 are provided with front and rear longitudinally extending webs 9 and 10 having ball and socket connections 11 for connecting the respective frame members to each other for vertical pivotal movement. Each of the end members 7 are provided with bearings 12 within which a shaft 13 is journalled, the shafts of the respective frame members being connected by an extension 14 having a ball and socket connection 15 with each of the shafts 13 as shown to advantage in Figure 4 of the drawings.

To the outermost end plate 7 of each of the frame members 5 and 6 is secured a gear housing 16 and a similar gear housing 17 is also secured to the inner end plate of the frame member 5 as shown in Figure 1 of the drawings. A stub axle 18 is provided with an upstanding extension 19 which is inserted through each of the gear housings 16, the upper end of the extension being provided with a rack 20 engaged by a pinion 21 arranged within the housing and operated by a shaft 22. Ground wheels 23 are journaled on each of the stub axles 18.

Projecting forwardly from each of the frame sections 5 and 6 are brace beams 24, the front ends of the beams converging toward each other and are connected at their front ends to a sectional plate 25, the sections of which are hinged along their longitudinal edges as at 25' on a draw bar 26, the rear end of the bar being pivoted as at 26'. Mounted on the plate 25 is a gear housing 27 having a transversely extending shaft 28 journaled therein and on which a plurality of bevel gears 29 are secured. Bevel gears 30 operatively engage each of the bevel gears 29, the bevel gears 30 being mounted on shaft sections 31 extending rearwardly through openings in the rear face of the housing, and to each of the shaft sections 31 are attached shaft extension 33 by means of ball and socket connections 34, the rear ends of the shaft extensions 33 being connected to the respective shafts 22. One end of the shaft 28 extends into a housing extension 35 in which a worm gear 36 is positioned and mounted on the shaft 28, the worm gear being operatively engaged by a worm 37 on a shaft 38 which projects upwardly at the front end of the machine and is provided with an operating wheel 39.

From the foregoing it will be apparent that through the manipulation of the wheel 39 that the respective stub axles 18 may be raised or lowered whereby to vertically adjust the frame members 5 and 6.

Secured to each of the shafts 13 of the respective frame members 5 and 6, is a cylindrical frame designated generally at 40, including a plurality of longitudinally extending spaced frame members or slots 41 and a plurality of spacing disks 42. The members 40 constitute pulverizing drums on which pulverizing teeth 43 are secured to the longitudinally extending frame members 41.

Secured to the shaft 13 is a bevel gear 44 operatively engaged by a pinion 45 mounted on a forwardly extending shaft 46 extending into a 2 speed transmission gear housing 47 of conventional construction and controlled by a gear shift lever 47'. The gears 44 and 45 are enclosed within a housing 48 which is secured to one of the end frame members 7. A shaft 48' extends forwardly from the 2 speed transmission gear housing 47, the shaft 48' having a ball and socket connection 49 with a drive shaft extension 50 which extends to a power take-off from a tractor (not shown).

The drive connection for the pulverizing members 40 is arranged to rotate said members in the same direction as the forward movement of the wheels 23.

As shown to advantage in Figure 8 of the drawings, and pulverizing teeth 43 include a shank portion 51 adjacent the inner end of which is a conical member 52 having longitudinally extending ribs 53 formed thereon, the conical member and the ribs being adapted to conformably seat in openings 54 formed in the longitudinal frame members 41. The inner end of the shank 51 terminates in a threaded extension 55 for receiving a nut 56 whereby to secure the teeth on the pulverizing drum.

The outer ends of the teeth may be of any suitable construction, such as illustrated in Figures 8, 11 and 12 of the drawings.

In Figure 10 of the drawings I have illustrated a further modified tooth construction which comprises an arcuate-shaped blade 57 having its inner edge provided with a plurality of threaded stems 58 for engaging through the openings of the longitudinal frame members 41 for attaching thereto. The blades 57 are adapted for attaching to the pulverizing drum in circumferential relation, substantially in the form of cultivating disks.

In addition to the pulverizing teeth carried by the rotating pulverizing drum, a plurality of cultivating plows P may also be attached to the frame members of the device.

The connected ends of the frames 5 and 6 are supported by a center wheel 59, having a disk 60 secured at each side thereof connected by a hub 61 on which the wheel rotates, the hub being provided with a vertically extending slotted opening 62 for freely receiving the shaft connection 14. Rising from the left of the disk is an inverted U-shaped bracket 63 having a rack 64 on one leg of the bracket engaged by the pinion of the center gear housing 17 for vertically adjusting said center wheel. The other disk at the right of the wheel bears against a pair of spacing ribs 65 formed on the end plate 7 of the adjacent frame having slots 60' in said right disk to allow for wheel adjustment.

From the foregoing it will be apparent that as the machine moves over the ground the pulverizing drums will be rotated so that the teeth will engage clods or lumps of earth to break the same in the desired manner.

It is believed the details of construction, operation and advantages of the device will be readily understood from the foregoing without further detailed explanation.

Having thus described the invention, what I claim is:

A ground pulverizer comprising a pair of frames, means swivelly connecting the frames in endwise relation, a toothed pulverizing drum rotatably mounted on each frame, drive means for the drums, wheels supporting the outer ends of the frames and a wheel also supporting the connected ends of the frame, means for vertically adjusting the frames on the wheels and including a rack and gear construction between the frames and the wheels, shafts for the gears and a common operating device for the shafts.

JAMES RUSSELL BRYANT.